US012106745B2

(12) United States Patent
Danjyo et al.

(10) Patent No.: US 12,106,745 B2
(45) Date of Patent: Oct. 1, 2024

(54) ELECTRONIC MUSICAL INSTRUMENT AND CONTROL METHOD FOR ELECTRONIC MUSICAL INSTRUMENT

(71) Applicant: CASIO COMPUTER CO., LTD., Tokyo (JP)

(72) Inventors: Makoto Danjyo, Saitama (JP); Fumiaki Ota, Tokyo (JP); Atsushi Nakamura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 666 days.

(21) Appl. No.: 17/202,160

(22) Filed: Mar. 15, 2021

(65) Prior Publication Data

US 2021/0295819 A1 Sep. 23, 2021

(30) Foreign Application Priority Data

Mar. 23, 2020 (JP) ................................ 2020-051215

(51) Int. Cl.
*G10L 13/033* (2013.01)
*G10H 1/00* (2006.01)
(Continued)

(52) U.S. Cl.
CPC ....... *G10L 13/0335* (2013.01); *G10H 1/0008* (2013.01); *G10H 1/361* (2013.01); *G10L 13/04* (2013.01); *G10H 2210/005* (2013.01)

(58) Field of Classification Search
CPC ... G10L 13/0335; G10L 13/04; G10H 1/0008; G10H 1/361; G10H 2210/005
(Continued)

(56) References Cited

U.S. PATENT DOCUMENTS 5,777,251 A 7/1998 Hotta et al.
6,245,983 B1 * 6/2001 Ishiguro .............. G10H 1/0058 84/478

(Continued)

FOREIGN PATENT DOCUMENTS

CN 107430848 A 12/2017
JP H02-269398 A 11/1990

(Continued)

OTHER PUBLICATIONS

Japanese Office Action dated Nov. 2, 2021, in a counterpart Japanese patent application No. 2019-231927. (Cited in the related U.S. Appl. No. 17/129,653 and a machine translation (not reviewed for accuracy) attached.).

(Continued)

*Primary Examiner* — Christina M Schreiber
(74) *Attorney, Agent, or Firm* — CHEN YOSHIMURA LLP

(57) ABSTRACT

An electronic musical instrument outputs synthesized lyrics of a song based on lyric data in accordance with operations by a user. One or more processors in electronic musical instrument generate voice synthesis data for a lyric of the song based on the lyric data for the song at a timing at which said lyric is supposed to be outputted regardless of whether or not a user operation of the operating unit is detected at said timing; when the user operation of the operating unit is detected at said timing, cause voice sound synthesized based on the generated voice synthesis data to be outputted; and when the user operation of the operating unit is not detected at said timing, cause the voice sound synthesized based on the generated voice synthesis data not to be outputted.

16 Claims, 7 Drawing Sheets

(51) Int. Cl.
*G10H 1/36* (2006.01)
*G10L 13/04* (2013.01)

(58) Field of Classification Search
USPC ........................................................ 84/610
See application file for complete search history.

(56) References Cited

U.S. PATENT DOCUMENTS

| | | | | |
|---|---|---|---|---|
| 10,002,604 | B2 * | 6/2018 | Kayama | G10H 1/0551 |
| 10,825,433 | B2 | 11/2020 | Danjyo et al. | |
| 11,468,870 | B2 | 10/2022 | Danjyo et al. | |
| 2004/0040434 | A1 | 3/2004 | Kondo et al. | |
| 2014/0006031 | A1 | 1/2014 | Mizuguchi et al. | |
| 2014/0136207 | A1 * | 5/2014 | Kayama | G10H 1/344 704/258 |
| 2017/0025115 | A1 | 1/2017 | Tachibana et al. | |
| 2018/0018957 | A1 | 1/2018 | Hamano et al. | |
| 2018/0277075 | A1 * | 9/2018 | Nakamura | G10H 1/344 |
| 2019/0318712 | A1 * | 10/2019 | Nakamura | G10H 1/366 |
| 2019/0318715 | A1 * | 10/2019 | Danjyo | G10H 1/0016 |
| 2019/0392798 | A1 * | 12/2019 | Danjyo | G10H 1/0008 |
| 2019/0392799 | A1 * | 12/2019 | Danjyo | G10H 7/008 |
| 2019/0392807 | A1 * | 12/2019 | Danjyo | G10L 13/033 |
| 2020/0294485 | A1 | 9/2020 | Danjyo et al. | |
| 2020/0312288 | A1 | 10/2020 | Sato | |
| 2021/0012758 | A1 * | 1/2021 | Danjyo | G10H 1/366 |
| 2021/0027753 | A1 * | 1/2021 | Danjyo | G10H 7/004 |
| 2021/0193098 | A1 * | 6/2021 | Danjyo | G10L 13/047 |
| 2021/0193114 | A1 * | 6/2021 | Danjyo | G10L 13/02 |
| 2021/0295819 | A1 * | 9/2021 | Danjyo | G10L 13/0335 |
| 2022/0076651 | A1 | 3/2022 | Danjyo et al. | |
| 2022/0076658 | A1 | 3/2022 | Danjyo et al. | |

FOREIGN PATENT DOCUMENTS

| | | | | |
|---|---|---|---|---|
| JP | H4-349497 | A | 12/1992 | |
| JP | H05-188953 | A | 7/1993 | |
| JP | 2000-276147 | A | 10/2000 | |
| JP | 2003-295873 | A | 10/2003 | |
| JP | 4735544 | B2 | 7/2011 | |
| JP | 2011-221085 | A | 11/2011 | |
| JP | 2012-083570 | A | 4/2012 | |
| JP | 2014010190 | A | 1/2014 | |
| JP | 2014-095856 | A | 5/2014 | |
| JP | 2018-54767 | A | 4/2018 | |
| JP | 2018-159831 | A | 10/2018 | |
| JP | 2019184936 | A * | 10/2019 | G10H 1/0016 |
| JP | 6610715 | B1 | 11/2019 | |
| JP | 2020-3816 | A | 1/2020 | |
| JP | 2020024456 | A * | 2/2020 | |
| JP | 2021-099461 | A | 7/2021 | |

OTHER PUBLICATIONS

Japanese Office Action dated Nov. 2, 2021, in a counterpart Japanese patent application No. 2019-231928. (Cited in the related U.S. Appl. No. 17/129,724 and a machine translation (not reviewed for accuracy) attached.).
Japanese Office Action dated Jun. 20, 2023, in a counterpart Japanese patent application No. 2022-092637. (Cited in the related U.S. Appl. No. 17/129,653 and a machine translation (not reviewed for accuracy) attached.).
Office Action issued Apr. 21, 2023 in U.S. Appl. No. 17/129,724, which has been cross-referenced to the instant application.
U.S. Appl. No. 17/129,653, filed Dec. 21, 2020.
U.S. Appl. No. 17/129,724, filed Dec. 21, 2020.

* cited by examiner

ELECTRONIC MUSICAL INSTRUMENT AND CONTROL METHOD FOR ELECTRONIC MUSICAL INSTRUMENT

BACKGROUND OF THE INVENTION

Technical Field

The present disclosure relates to an electronic musical instrument and a control method for the electronic musical instrument.

Background Art

A technique for advancing lyrics in synchronization with a performance based on a user operation using a keyboard or the like is disclosed in for example, Japanese Patent No. 4735544.

SUMMARY OF THE INVENTION

Features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

In one aspect, the present disclosure provides an electronic musical instrument that can output synthesized lyrics of a song based on lyric data in accordance with operations by a user, comprising: an operating unit that receives an operation by the user to specify a pitch; and one or more processors electrically connected to the operating unit, the one or more processors performing the following: generating voice synthesis data for a lyric of the song based on the lyric data for the song at a timing at which said lyric is supposed to be outputted regardless of whether or not a user operation of the operating unit is detected at said timing; when the user operation of the operating unit is detected at said timing, causing voice sound synthesized based on the generated voice synthesis data to be outputted; and when the user operation of the operating unit is not detected at said timing, causing the voice sound synthesized based on the generated voice synthesis data not to be outputted.

In another aspect, the present disclosure provides a method of controlling an electronic musical instrument performed by one or more processors included in the electronic musical instrument, the electronic musical instrument being configured to output synthesized lyrics of a song based on lyric data in accordance with operations by a user, and including an operating unit that receives an operation by the user to specify a pitch in addition to the one or more processors, the method comprising, via the one or more processors: generating voice synthesis data for a lyric of the song based on the lyric data for the song at a timing at which said lyric is supposed to be outputted regardless of whether or not a user operation of the operating unit is detected at said timing; when the user operation of the operating unit is detected at said timing, causing voice sound synthesized based on the generated voice synthesis data to be outputted; and when the user operation of the operating unit is not detected at said timing, causing the voice sound synthesized based on the generated voice synthesis data not to be outputted.

In another aspect, the present disclosure provides an electronic musical instrument that can output synthesized lyrics of a song based on lyric data in accordance with operations by a user, comprising: an operating unit that receives an operation by the user to specify a pitch; and one or more processors electrically connected to the operating unit, wherein the lyric data includes first character data corresponding to a first timing, second character data corresponding to a second timing after the first timing, and third character data corresponding to a third timing after the second timing, wherein the one or more processors perform the following: when the user operation is detected at the first timing, causing synthesized voice sound corresponding to the first character data to be outputted; and when the user operation is not detected at the second timing and the user operation is detected at the third timing, causing synthesized voice sound corresponding to the second character data not to be outputted and synthesized voice sound corresponding to the third character data to be outputted.

In still another aspect, the present disclosure provides a method of controlling an electronic musical instrument performed by one or more processors included in the electronic musical instrument, the electronic musical instrument being configured to output synthesized lyrics of a song based on lyric data in accordance with operations by a user, and including an operating unit that receives an operation by the user to specify a pitch in addition to the one or more processors, wherein the lyric data includes first character data corresponding to a first timing, second character data corresponding to a second timing after the first timing, and third character data corresponding to a third timing after the second timing, and wherein the method comprises, via the one or more processors: when the user operation is detected at the first timing, causing synthesized voice sound corresponding to the first character data to be outputted; and when the user operation is not detected at the second timing and the user operation is detected at the third timing, causing synthesized voice sound corresponding to the second character data not to be outputted and synthesized voice sound corresponding to the third character data to be outputted.

According to theses aspects of the present invention, it is possible to appropriately control the lyric progression related to the performance.

It is to be understood that both the foregoing general description and the following detailed description are exemplary and explanatory, and are intended to provide further explanation of the invention as claimed.

DETAILED DESCRIPTION OF EMBODIMENTS

Figure 1:
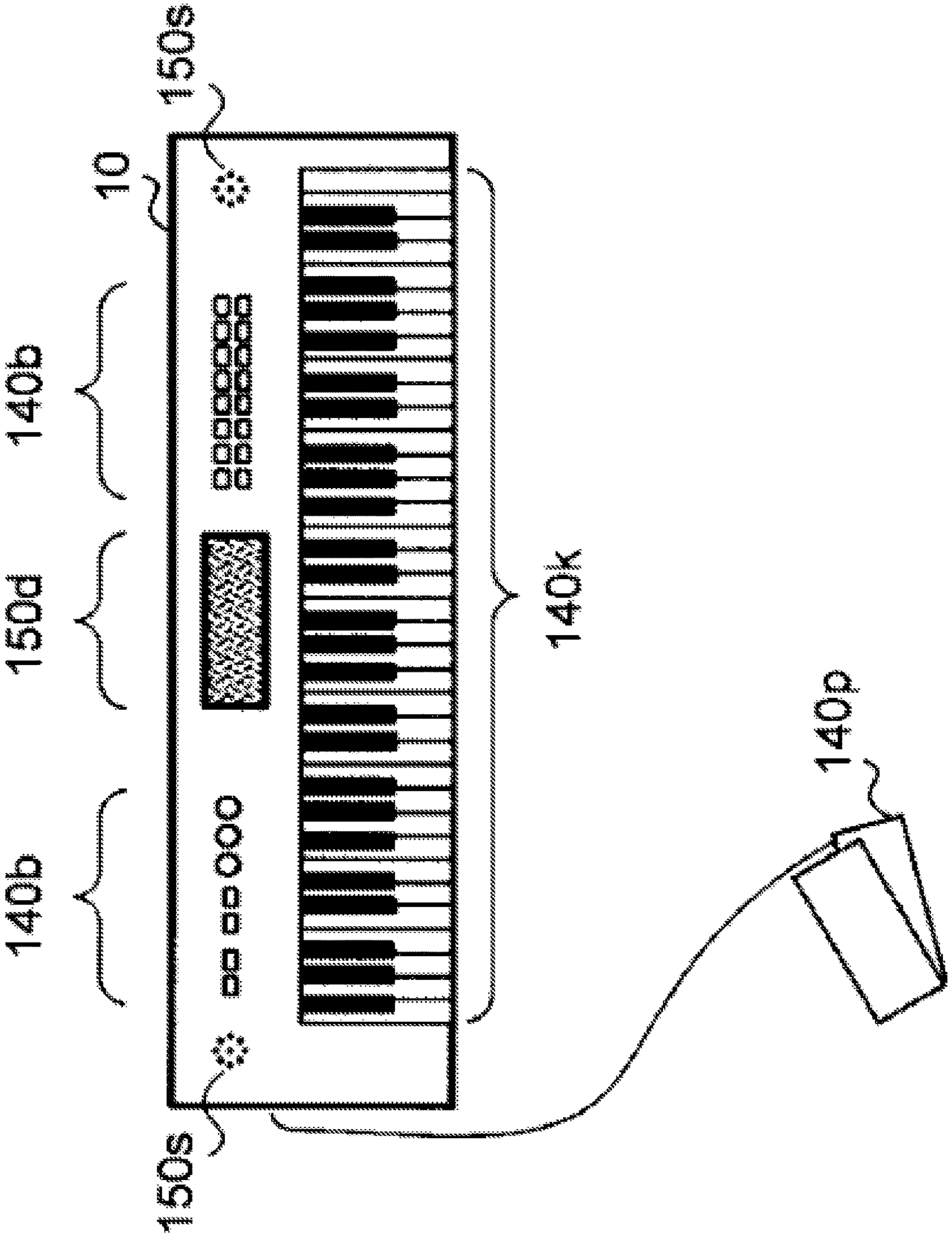
FIG. 1 shows an example of the overall appearance of an electronic musical instrument 10 according to an embodiment of the present invention.

The present inventors have conceived of controlling the permission and denial of sound production according to the singing voice waveform data while generating the singing voice waveform data (voice synthesis data) regardless of the performance operation of the user, and have developed the electronic musical instrument of the present disclosure.

According to at least some of aspects of the present disclosure, the progress of the lyrics to be produced can be easily controlled based on the operation of the user.

Hereinafter, embodiments of the present disclosure will be described in detail with reference to the accompanying drawings. In the following description, the same parts are designated by the same reference numerals. Since the same part has the same name and function, detailed explanation will not be repeated.

(Electronic Musical Instrument)

FIG. 1 is a diagram showing an example of the appearance of an electronic musical instrument 10 according to an embodiment of the present invention. The electronic musical instrument 10 may be equipped with a switch (button) panel 140*b*, a keyboard 140*k*, a pedal 140*p*, a display 150*d*, a speaker 150*s*, and the like.

The electronic musical instrument 10 is a device that receives input from a user via playing elements (operating unit) such as a keyboard or a switch, and that controls music performance, lyrics progression, and the like. The electronic musical instrument 10 may be a device having a function of generating sound according to performance information such as MIDI (Musical Instrument Digital Interface) data. The device may be an electronic musical instrument (electronic piano, synthesizer, etc.), or may be an analog musical instrument equipped with a sensor or the like and configured to have the function of the playing elements described above.

The switch panel 140*b* may include switches for specifying a volume, a sound source, a tone color setting, a song (accompaniment), song selection (accompaniment selection), a song playback start/stop, a song playback setting (tempo, etc.), etc.

The keyboard 140*k* (operating unit) may have a plurality of keys as performance elements (operating elements). The pedal 140*p* may be a sustain pedal having a function of extending the sound of the pressed keyboard while the pedal is being depressed, or may be a pedal for operating an effector that processes a tone, volume, or the like.

In the present disclosure, the sustain pedal, pedal, foot switch, controller (operator), switch, button, touch panel, etc., may be interchangeably used to mean the same functional element. Depressing the pedal in the present disclosure may be understood to mean operating the controller.

A key may be referred to as a performance/playing/operating manipulator or element, a pitch manipulator or element, a tone manipulator or element, a direct manipulator or element, a first manipulator or element, or the like. A pedal may be referred to as a non-playing element, a non-pitched element, a non-tone operator, an indirect manipulator or element, a second operating manipulator or element, or the like.

The display 150*d* may display lyrics, musical scores, various setting information, and the like. The speaker 150*s* may be used to emit the sound generated by the performance.

The electronic musical instrument 10 may be configured to generate or convert at least one of a MIDI message (event) and an Open Sound Control (OSC) message.

The electronic musical instrument 10 may be called a control device 10, a lyrics progression control device 10, and the like.

The electronic musical instrument 10 is connected to a network (Internet, etc.) via at least one of wired and wireless communication schemes (for example, Long Term Evolution (LTE), 5th generation mobile communication system New Radio (5G NR), Wi-Fi (registered trademark), etc.).

The electronic musical instrument 10 may hold singing voice data (or referred to as singing data; may also be called lyrics text data, lyrics information, etc.) related to lyrics whose progress is controlled in advance, or may transmit and/or receive such singing voice data via a network. The singing voice data may be text described by a musical score description language (for example, MusicXML), may be expressed in a MIDI data storage format (for example, Standard MIDI File (SMF) format), or may be text given in a standard text file. The singing voice data may be singing voice data (singing voice) 215, which will be described later. In the present disclosure, the terms, singing voice, singing, voice, sound, and the like may be interchangeably used to mean the same concept when appropriate.

The electronic musical instrument 10 may acquire the content of the user singing in real time through a microphone or the like provided in the electronic musical instrument 10, and may acquire the text data obtained by applying the voice recognition process to the electronic musical instrument 10 as the singing voice data.

Figure 2:
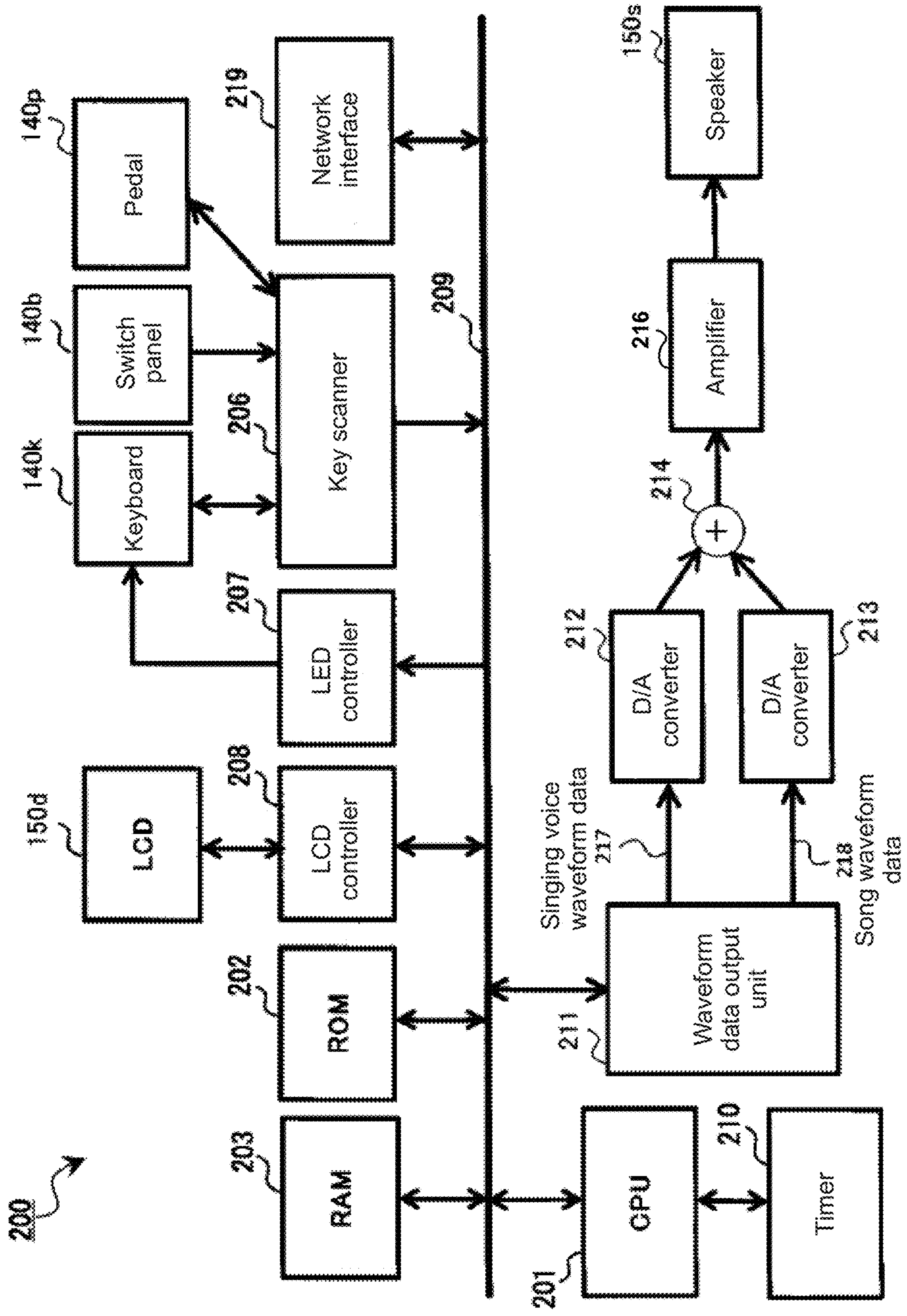
FIG. 2 shows an example of the hardware configuration of the control system 200 of the electronic musical instrument 10 according to an embodiment.

FIG. 2 is a diagram showing an example of the hardware configuration of the control system 200 of the electronic musical instrument 10 according to an embodiment of the present invention.

Central processing unit (CPU) 201, ROM (read-only memory) 202, RAM (random access memory) 203, waveform data output unit 211, key scanner 206 to which switch (button) panel 140*b*, keyboard 140*k*, and pedal 140*p* in FIG. 1 are connected, LED controller 207 connected to the keyboard 140*k*, and LCD controller 208 to which the LCD (Liquid Crystal Display) as an example of the display 150*d* of FIG. 1 is connected are connected to the system bus 209, respectively.

A timer 210 (which may be called a counter) for controlling the performance may be connected to the CPU 201. The timer 210 may be used, for example, to count the progress of the automatic performance of the electronic musical instrument 10. The CPU 201 may be referred to as a processor, and may include an interface with a peripheral circuit, a control circuit, an arithmetic circuit, a register, and the like.

The function of each device may be realized by reading predetermined software (program) into hardware, such as the processor 201 and the memory 203, and by having the processor 201 perform corresponding operations and by controlling the communication by the communication channel 209 and controlling reading/writing of the data in the memory 203 and a storage device.

The CPU 201 executes the control operation of the electronic musical instrument 10 of FIG. 1 by executing the control program stored in the ROM 202 while using the RAM 203 as the work memory. In addition to the control program and various fixed data, the ROM 202 may store singing voice data, accompaniment data, song data including these, and the like.

The waveform data output unit 211 may include a sound source LSI (large-scale integrated circuit), a voice synthesis LSI, and the like. The sound source LSI and the voice synthesis LSI may be integrated into one LSI. A specific block diagram of the waveform data output unit 211 will be described later with reference to FIG. 3. A part of the processing of the waveform data output unit 211 may be performed by the CPU 201, or may be performed by a CPU included in the waveform data output unit 211.

The singing voice waveform data 217 and the song waveform data 218 output from the waveform data output unit 211 are converted into an analog singing voice output signal and an analog music sound output signal by the D/A converters 212 and 213, respectively. The analog music sound output signal and the analog singing voice output signal may be mixed by the mixer 214, amplified by the amplifier 216, and then output from the speaker 150*s* or the output terminal. The singing voice waveform data may be called singing voice synthesis data (or voice synthesis data). Alternatively, the singing voice waveform data 217 and the song waveform data 218 may be digitally mixed and then converted to the analog signal by a D/A converter to obtain a mixed signal.

The key scanner (scanner) 206 constantly scans the key pressing/releasing state of the keyboard 140*k* in FIG. 1, the switch operating state of the switch panel 140*b*, the pedal operating state of the pedal 140*p*, and the like, and interrupts the CPU 201 to report the finding.

The LCD controller 208 is an IC (integrated circuit) that controls the display state of the LCD, which is an example of the display 150*d*.

The system configuration is an example and is not limited to this. For example, the number of each circuit included is not limited to this. The electronic musical instrument 10 may have a configuration that does not include a part of circuits (mechanisms), or may have a configuration in which the function of one circuit is realized by a plurality of circuits. It may have a configuration in which the functions of a plurality of circuits are realized by one circuit.

In addition, the electronic instrument 10 may be constructed by including various types of hardware, such as a microprocessor, a digital signal processor (DSP: Digital Signal Processor), an ASIC (Application Specific Integrated Circuit), a PLD (Programmable Logic Device), an FPGA (Field Programmable Gate Array), and the like. Such hardware may realize a part or all of the functional blocks. For example, the CPU 201 may be implemented on at least one of these types of hardware.

<Generation of Acoustic Model>

Figure 3:
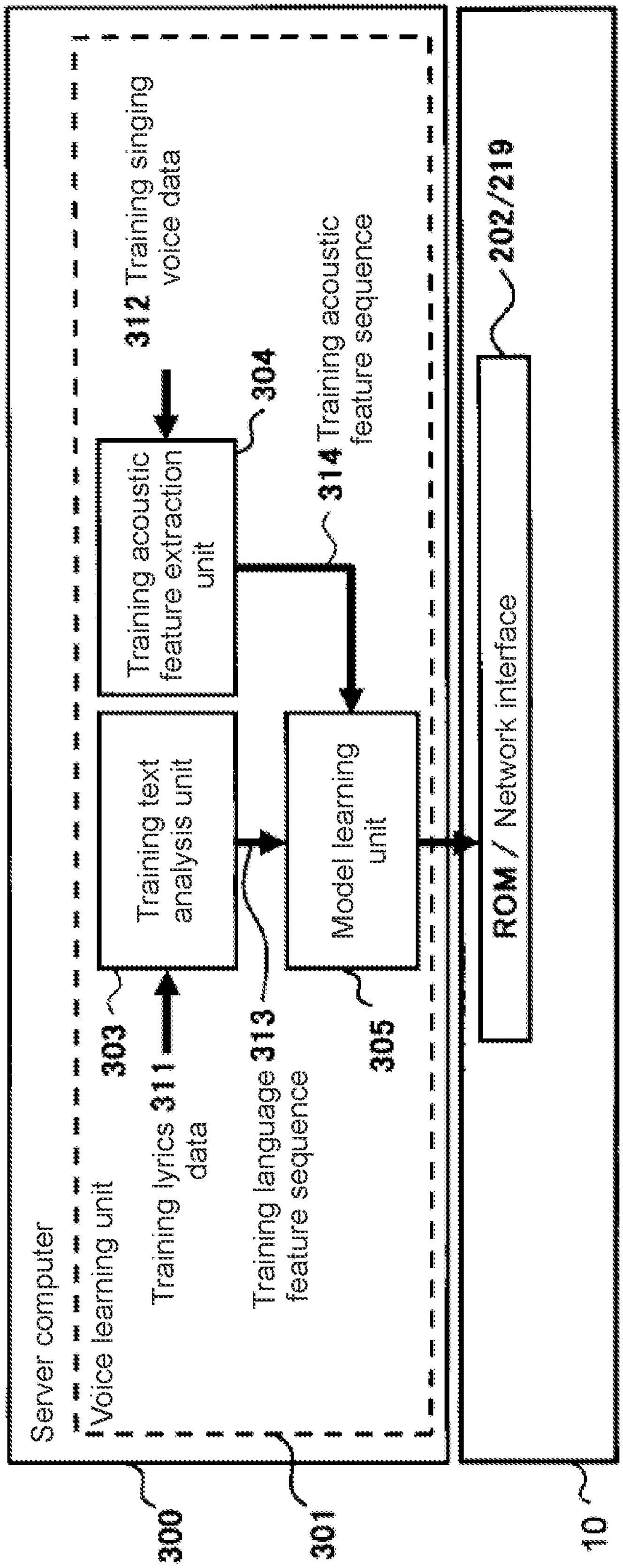
FIG. 3 shows a configuration example of the voice learning unit 301 according to an embodiment.

FIG. 3 is a diagram showing an example of the configuration of a voice learning unit 301 according to an embodiment of the present invention. The voice learning unit 301 may be implemented as a function executed by the server computer 300 existing outside the electronic musical instrument 10 of FIG. 1. The voice learning unit 301 may alternatively be built in the electronic musical instrument 10 as a function executed by the CPU 201, the voice synthesis LSI, and the like.

The voice learning unit 301 and the waveform data output unit 211 that realize voice synthesis in the present disclosure may be implemented based on a statistical speech synthesis technique based on deep learning, for example.

The voice learning unit 301 may include a training text analysis unit 303, a training acoustic feature extraction unit 304, and a model learning unit 305.

In the voice learning unit 301, as the training singing voice data 312, for example, a voice recording of a plurality of singing songs of an appropriate genre sung by a certain singer is used. Further, as the training singing data 311, the lyrics text of each song is prepared.

The training text analysis unit 303 receives the training singing data 311 that includes the lyrics text and analyzes the data. As a result, the training text analysis unit 303 estimates and outputs the training language feature sequence 313, which is a discrete numerical sequence expressing phonemes, pitches, etc., corresponding to the training singing data 311.

The training acoustic feature extraction unit 304 receives and analyzes the training singing voice data 312, which is acquired through a microphone or the like by a singer singing a lyrics text corresponding to the training singing data 311 in accordance with the input of the training singing data 311. As a result, the training acoustic feature extraction unit 304 extracts and outputs the training acoustic feature sequence 314 representing the voice features corresponding to the training singing voice data 312.

In the present disclosure, the training acoustic feature sequence 314 and an acoustic feature sequence corresponding to an acoustic feature sequence described later include acoustic feature data (formant information, spectrum information, etc.) that models the human vocal tract and vocal cord sound source data (which may be called sound source information) that models a human vocal cord. As the spectrum information, for example, mel cepstral, line spectrum pairs (LSP) and the like may be used. As the sound source information, a fundamental frequency (F0) indicating the pitch frequency of human voice and power values can be used.

The model learning unit 305 estimates by machine learning an acoustic model that maximizes the probability that the training acoustic feature sequence 314 is generated from the learning language feature sequence 313. That is, the relationship between the language feature sequence that is text and the acoustic feature sequence that is voice is expressed by a statistical model, which is an acoustic model. The model learning unit 305 outputs model parameters representing the acoustic model calculated as a result of machine learning as a learning result 315. Therefore, the trained model constitutes the acoustic model.

HMM (Hidden Markov Model: Hidden Markov Model) may be used as the acoustic model expressed by the learning result 315 (model parameter).

An HMM acoustic model may learn how the characteristic parameters of the vocal cord vibration and vocal tract characteristics change over time when a singer utters lyrics along a certain melody. More specifically, the HMM acoustic model may be a phoneme-based model of the spectrum, fundamental frequency, and their time structure obtained from the training singing voice data.

First, the processing of the voice learning unit 301 of FIG. 3 in which the HMM acoustic model is adopted will be described. The model learning unit 305 in the voice learning unit 301 receives the training language feature sequence 313 output by the training text analysis unit 303 and the training acoustic feature sequence 314 output by the training acoustic feature extraction unit 304 and may learn the HMM acoustic model having the maximum likelihood.

The spectral parameters of the singing voice can be modeled by a continuous HMM. On the other hand, since the log fundamental frequency (F0) is a variable-dimensional time series signal that takes a continuous value in the voiced section and has no value in the unvoiced section, it cannot be directly modeled by a normal continuous HMM or a discrete HMM. Therefore, using a MSD-HMM (Multi-Space probability Distribution HMM), the spectral parameters of the singing voice are modeled by regarding mel cepstrum as a multidimensional Gaussian distribution, and the log fundamental frequency (F0) is modeled by regarding the logarithmic fundamental frequency (F0) in the voiced section as a one-dimensional Gaussian distribution and F0 in the unvoiced section as a zero-dimensional Gaussian distribution, at the same time.

Further, it is known that the characteristics of phonemes constituting a singing voice fluctuate under the influence of various factors even if the phonemes have the same acoustic characteristics. For example, the spectrum and the logarithmic fundamental frequency (F0) of a phoneme, which is a basic unit of vocal sounds, differ depending on the singing style and tempo, the lyrics before and after, the pitch, and the like. These factors that affect such acoustic features are called context.

In the statistical voice synthesis processing according to an embodiment of the present invention, an HMM acoustic model (context-dependent model) in consideration of context may be adopted in order to accurately model the acoustic features of voice sound. Specifically, the training text analysis unit 303 considers not only the phonemes and pitches for each frame, but also the phonemes immediately before and after, the current position, the vibrato immediately before and after, the accent, and the like when outputting the training language feature sequence 313. In addition, decision tree-based context clustering may be used to improve the efficiency of context combinations.

For example, the model learning unit 305 may output a state continuation length decision tree as the learning result 315 based on the training language feature sequence 313 that corresponds to the contexts of a large number of phonemes concerning the state continuation length that is extracted by the training text analysis unit 303 from the training singing data 311.

Further, the model learning unit 305 may output, for example, a mel cepstrum parameter decision tree for determining mel cepstrum parameters as the learning result 315, based on the training acoustic feature sequence 314, which corresponds to a large number of phonemes relating to the mel cepstrum parameters that is extracted by the training acoustic feature extraction unit 304 from the training singing voice data 312.

Further, the model learning unit 305 may output, for example, the log fundamental frequency decision tree for determining the log fundamental frequency (F0) as the learning result 315, based on the training acoustic feature sequence 314, which corresponds to a large number of phonemes relating to the log fundamental frequency (F0) that is extracted by the training acoustic feature extraction unit 304 from the training singing voice data 312. Here, the log fundamental frequency (F0) in the voiced section and that in the unvoiced section may be modelled by MSD-HMM that can handle variable dimensions as a one-dimensional Gaussian distribution and as a zero-dimensional Gaussian distribution, respectively, in generating the log fundamental frequency decision tree.

In addition, instead of or in addition to the acoustic model based on HMM, an acoustic model based on Deep Neural Network (DNN) may be adopted. In this case, the model learning unit 305 may generate model parameters representing the nonlinear transformation (activation) function of each neuron in the DNN from the language features to the acoustic features as the learning result 315. According to the DNN, it is possible to express the relationship between the language feature sequence and the acoustic feature sequence by using a complicated nonlinear transformation function that is difficult to express with a decision tree.

Further, the acoustic model of the present disclosure is not limited to these, and any voice synthesis method may be adopted as long as it is a technique using statistical voice synthesis processing, such as an acoustic model combining HMM and DNN, for example.

As shown in FIG. 3, the learning result 315 (model parameters) may be stored in the ROM 202 of the control system of the electronic musical instrument 10 of FIG. 2 at the time of shipment from the factory of the electronic musical instrument 10 of FIG. 1, and may be loaded from the ROM 202 of FIG. 2 into the singing voice control unit 307 described later in the waveform data output unit 211 when the electronic musical instrument 10 is turned on.

Alternatively, as shown in FIG. 3, for example, the learning result 315 may be downloaded to the singing voice control unit 307 in the waveform data output unit 211 from the outside such as the Internet via the network interface 219 by the user operating the switch panel 140*b* of the electronic musical instrument 10.

<Speech synthesis based on acoustic model>

Figure 4:
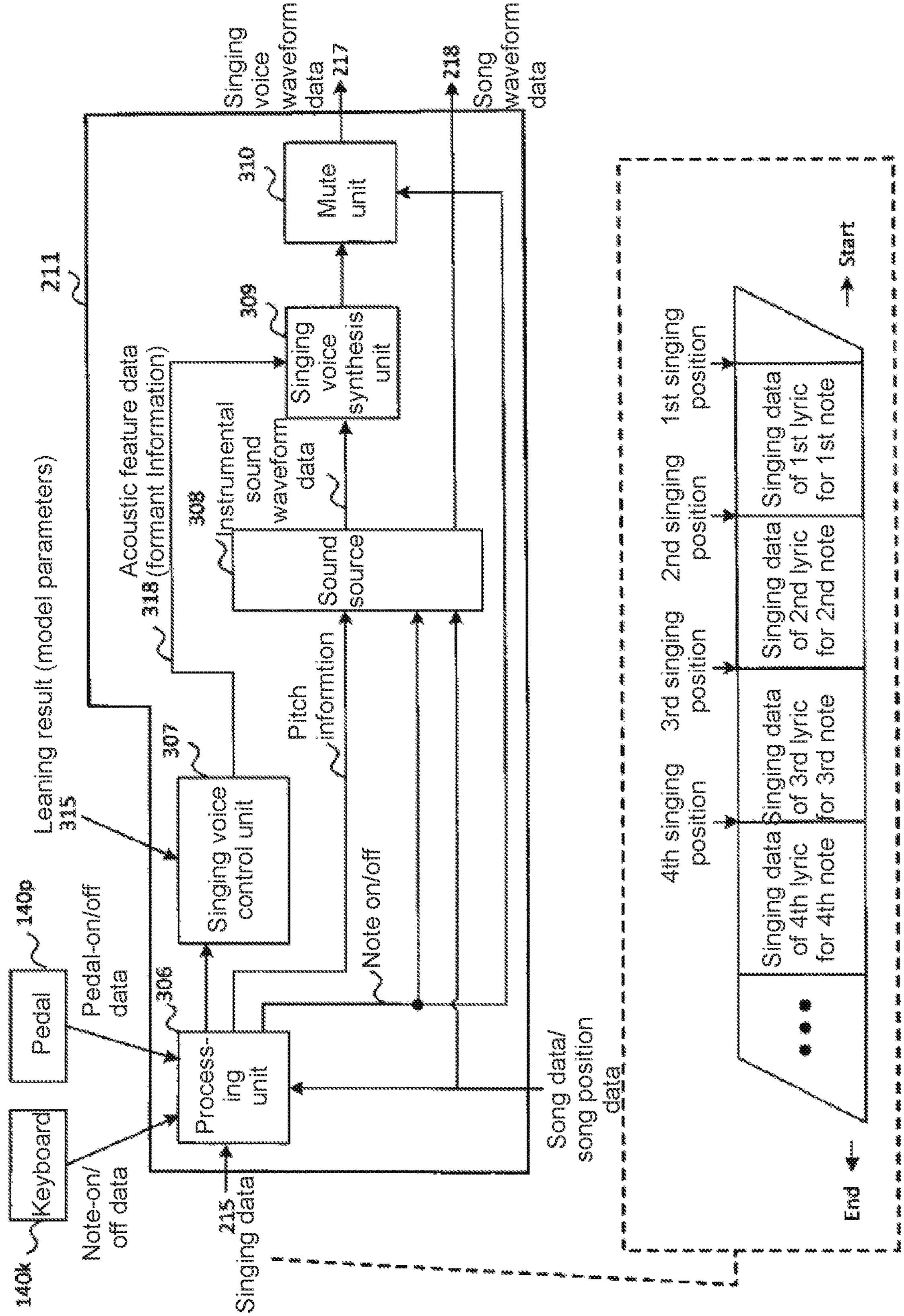
FIG. 4 shows an example of the waveform data output unit 211 according to an embodiment.

FIG. 4 is a diagram showing an example of the waveform data output unit 211 according to an embodiment of the present invention.

The waveform data output unit 211 includes a processing unit (may be called a text processing unit, a preprocessing unit, etc.) 306, a singing voice control unit (may be called an acoustic model unit) 307, a sound source 308, and a singing voice synthesis unit (may be called a vocal model unit) 309, a mute unit 310, and the like.

The waveform data output unit 211 receives singing voice data (singing data) 215 including lyrics and pitch information, which is instructed by the CPU 201 via the key scanner 206 of FIG. 2 based on the key pressed on the keyboard 140*k* of FIG. 1, and synthesizes and outputs the singing voice waveform data 217 corresponding to the lyrics and pitch. In other words, the waveform data output unit 211 executes a statistical voice synthesis process in which the singing voice waveform data 217 corresponding to the singing voice data 215 including the lyrics text is estimated and synthesized by a statistical model called an acoustic model that is set in the singing voice control unit 307.

Further, when the song data is played back, the waveform data output unit 211 outputs the song waveform data 218 corresponding to the corresponding song singing position. Here, the song data may correspond to data of accompaniment (for example, data for the pitch, timbre, and playback timing for one or more notes) or data of accompaniment and melody, and may be referred to as backtrack data and the like.

The processing unit 306 receives singing voice data 215 including information on the phonemes, pitches, etc., of the lyrics designated by the CPU 201 of FIG. 2 as a result of the performer's performance in accordance with the automatic performance, and analyzes the data. The singing voice data 215 is, for example, the data (for example, pitch data, note length data) of the n-th note (which may be referred to as the n-th note, the n-th timing, etc.), and may include the n-th lyric corresponding to the n-th note.

For example, the processing unit 306 determines whether the lyrics should progress based on a lyrics progression control method described later based on the note on/off data, pedal on/off data, etc., which are obtained from the operation of the keyboard 140*k* and the pedal 140*p*, and acquires singing voice data 215 corresponding to the lyrics to be output. Then, the processing unit 306 analyzes the language feature sequence expressing the phonemes, part of speech, words, etc., corresponding to the pitch data specified by the key press or the acquired pitch data of the singing voice data 215, and character data of the acquired singing voice data 215, and outputs the language feature sequence to the singing voice control unit 307.

The singing voice data may include at least one of lyrics (characters), syllable type (start syllable, middle syllable, end syllable, etc.), lyrics index, corresponding voice pitch (correct voice pitch), and corresponding uttering period (for example, utterance start timing, utterance end timing, utterance duration).

For example, in the example of FIG. 4, the singing voice data 215 includes the singing data of the n-th lyric corresponding to the n-th note (n=1, 2, 3, 4, . . . ), and information on the timing at which the n-th note should be played (the n-th lyric singing position). The singing data of the n-th lyric may be called the n-th lyric data. The n-th lyric data may include character data included in the n-th lyric (character data of the n-th lyric data), pitch data corresponding to the n-th lyric (pitch data of the n-th lyric data), and information on the length of the sound to be played corresponding to the n-th lyric.

The singing voice data (singing data) 215 may also include information (data in a specific audio file format, MIDI data, etc.) for playing the accompaniment (song data) corresponding to the lyrics. When the singing data is presented in the SMF format, the singing data 215 may have a track chunk in which data related to singing voice is stored and a track chunk in which data related to accompaniment is stored. The singing data 215 may be read from the ROM 202 into the RAM 203. The singing data 215 is stored in a memory (for example, ROM 202, RAM 203) before the performance.

The electronic musical instrument 10 may control the progress of automatic accompaniment based on an event indicated by the singing data 215 (for example, a meta event (timing information) that indicates the sound production (playback) timing and pitch of the lyrics, a MIDI event that instructs note-on or note-off, or a meta event that indicates a time signature, etc.).

Based on the language feature sequence input from the processing unit 306 and the acoustic model set as the learning result 315, the singing voice control unit 307 estimates the corresponding acoustic feature sequence. The formant information 318 corresponding to the acoustic feature sequence is then output to the singing voice synthesis unit 309.

For example, when the HMM acoustic model is adopted, the singing voice control unit 307 connects the HMMs with reference to the decision tree for each context obtained by the language feature sequence, and estimates the acoustic feature sequence (formant information 318 and the vocal cord sound source data 319) that makes the output probability from each connected HMM maximum.

When the DNN acoustic model is adopted, the singing voice control unit 307 may output the acoustic feature sequence for each frame with respect to the phoneme sequence of the language feature sequence that is inputted for each frame.

In FIG. 4, the processing unit 306 acquires musical instrument sound data (pitch information) corresponding to the pitch indicated by the pressed key from the memory (which may be ROM 202 or RAM 203) and outputs it to the sound source 308.

The sound source 308 generates a sound source signal (may be called instrumental sound waveform data) of musical instrument sound data (pitch information) corresponding to the sound to be produced (note-on) based on the note-on/off data inputted from the processing unit 306, and outputs it to the singing voice synthesis unit 309. The sound source 308 may execute control processing such as envelope control of the sound to be produced.

The singing voice synthesis unit 309 forms a digital filter that models the vocal tract based on the sequence of the formant information 318 sequentially inputted from the singing voice control unit 307. Further, the singing voice synthesis unit 309 uses the sound source signal input from the sound source 308 as an excitation source signal, applies the digital filter, and generates and outputs the singing voice waveform data 217, which is a digital signal. In this case, the singing voice synthesis unit 309 may be called a synthesis filter unit.

In addition, various voice synthesis methods, such as a cepstrum voice synthesis method and an LSP voice synthesis method, may be adopted for the singing voice synthesis unit 309.

The mute unit 310 applies a mute process to mute the singing voice waveform data 217 output from the singing voice synthesis unit 309 under prescribed conditions. For example, the mute unit 310 does not apply the mute process when a note-on signal is input (that is, there is a key press), and applies the mute process when a note-on signal is not input (that is, all keys are released). The mute process may be a process of reducing the volume of the waveform to 0 or to a very small volume (very low).

In the example of FIG. 4, since the output singing voice waveform data 217 uses the musical instrument sound as the sound source signal, the fidelity is slightly lost as compared with the actual singing voice of the singer. However, both of the instrumental sound atmosphere and the voice sound quality of the singer remain in the resulting singing voice waveform data 217, thereby producing effective singing voice waveform data.

The sound source 308 may output the output of another channel as the song waveform data 218 together with the processing of the musical instrument sound wave data. As a result, the accompaniment sound can be produced with a regular musical instrument sound, or the musical instrument sound of the melody line and the singing voice of the melody can be produced at the same time.

Figure 5:
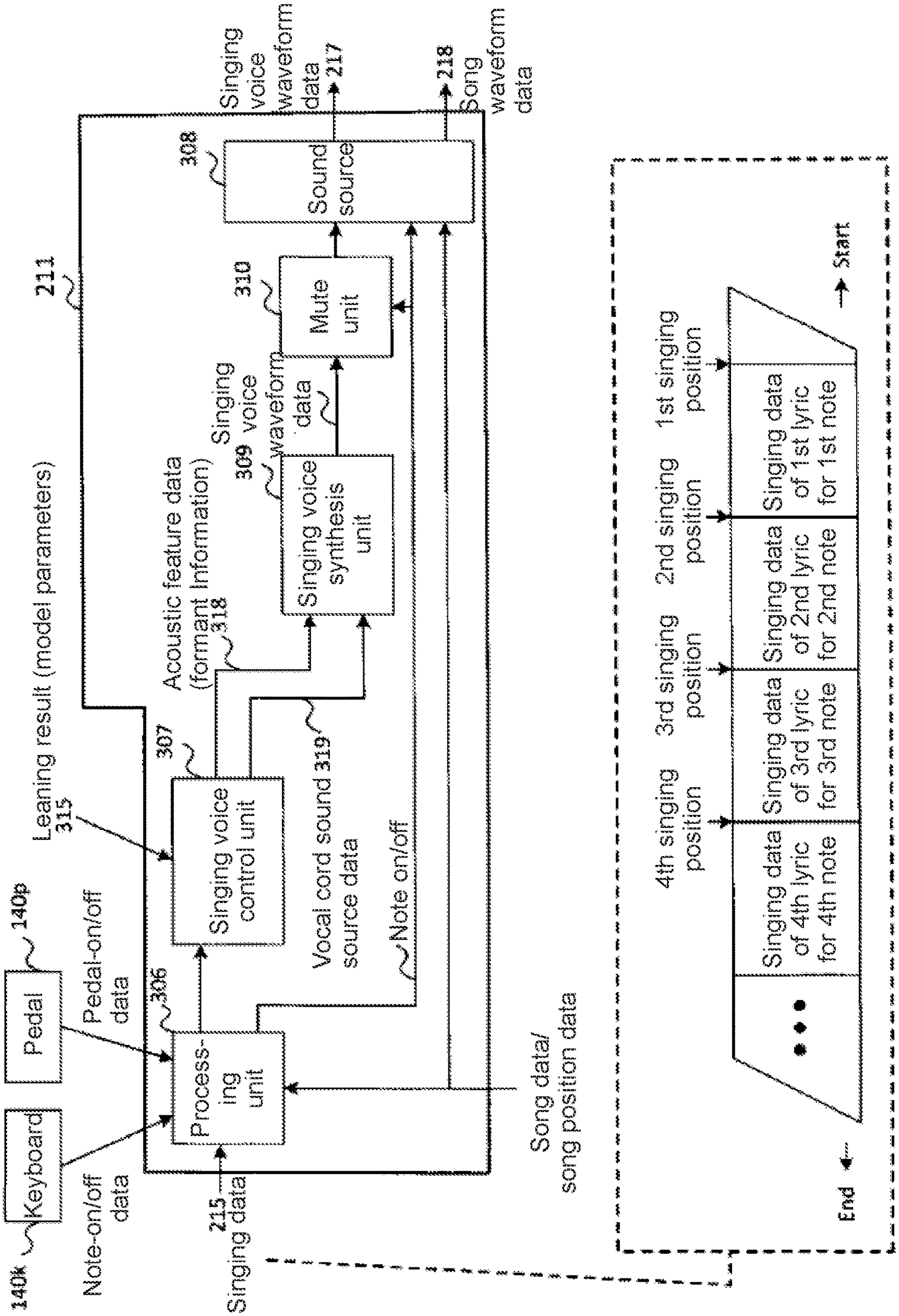
FIG. 5 shows another example of the waveform data output unit 211 according to an embodiment.

FIG. 5 is a diagram showing another example of the waveform data output unit 211 according to another embodiment of the present invention. The contents overlapping with FIG. 4 will not be repeatedly described.

As described above, the singing voice control unit 307 of FIG. 5 estimates the acoustic feature sequence based on the acoustic model. Then, the singing voice control unit 307 outputs, to the singing voice synthesis unit 309, formant information 318 corresponding to the estimated acoustic feature sequence and vocal cord sound source data 319 (pitch information) corresponding to the estimated acoustic feature sequence. The singing voice control unit 307 may estimate the acoustic feature sequence by the maximum likelihood scheme.

The singing voice synthesis unit 309 generates data (for example, the singing voice waveform data of the n-th lyric corresponding to the n-th note) that is for generating a signal obtained by applying a digital filter, which models the vocal cord based on the sequence of the formant information 318, to a pulse train that is periodically repeated with the fundamental frequency (F0) contained in the vocal cord sound source data 319 inputted from the singing voice control unit 307 and its power values (in the case of voiced sound elements), white noise (in the case of unvoiced phonetic elements) having a power value contained in the vocal cord sound source data 319, or a signal of a mixture thereof, and outputs the generated data to the sound source 308.

As shown in FIG. 4, under the certain conditions, the mute unit 310 applies the mute process to mute the singing voice waveform data 217 output from the singing voice synthesis unit 309.

The sound source 308 generates and outputs singing voice waveform data 217, which is a digital signal, from the singing voice waveform data of the n-th lyrics corresponding to the sound to be produced (note-on) based on the note-on/off data input from the processing unit 306.

In the example of FIG. 5, the output singing voice waveform data 217 is generated using a sound generated by the sound source 308 based on the vocal cord sound source data 319 as the sound source signal, and is therefore a signal completely modeled by the singing voice control unit 307. Therefore, the singing voice waveform data 217 can generate a singing voice that is very faithful to the singing voice of the singer and is natural.

In FIGS. 4 and 5, the mute unit 310 is located at a position where the output from the singing voice synthesis section 309 is input, but the arrangement of the mute unit 310 is not limited to this. For example, the mute unit 310 may be arranged at the output of the sound source 308 (or included in the sound source 308) to mute the musical instrument sound wave data or the singing voice waveform data output from the sound source 308.

In this way, the voice synthesis of the present disclosure differs from the existing vocoder (a method of inputting words spoken by a human with a microphone and replacing them with musical instrument sounds) in that even if the user (performer) does not actually sing (in other words, the user does not sing or input a voice signal in real time to the electronic musical instrument 10), a synthesized voice can be output by operating the keyboard.

As described above, by adopting the technique of statistical voice synthesis processing as the voice synthesis method, it is possible to realize a much smaller memory capacity as compared with the conventional element piece synthesis method. For example, an electronic musical instrument of the element piece synthesis method requires a memory having a storage capacity of several hundred megabytes for voice elemental data, but in the present embodiment, in order to store the model parameters of the learning result 315, a memory with a storage capacity of only a few megabytes is required. Therefore, it is possible to realize a lower-priced electronic musical instrument, which makes it possible for a wider group of users group to use a high-quality singing voice performance system.

Further, in the conventional element data method, since the element data needs to be manually adjusted, it takes a huge amount of time (years or so) and labor to create the data for singing voice performance. However, in this embodiment, creating the model parameters of the training result 315 for the HMM acoustic model or the DNN acoustic model requires only a fraction of the creation time and effort because there is little data adjustment required. This also makes it possible to realize a lower-priced electronic musical instrument.

In addition, a general user can make the acoustic model learn his/her own voice, family's voice, celebrity's voice, etc., by using the learning function built in the server computer 300 that can be used as a cloud service, or in the voice synthesis LSI (in the waveform data output unit 211, for example), etc., and have the electronic musical instrument perform voice singing using the learned voice as the model voice. In this case as well, it is possible to realize a singing voice performance that is much more natural and has a higher sound quality than the conventional art as a lower-priced electronic musical instrument.

(Lyrics Progression Control Method)

The lyrics progression control method according to an embodiment of the present disclosure will be described below. The lyrics progression control of the present disclosure may be referred to as performance control, performance, and the like.

Each segment of the following flowcharts may be mainly performed by any one of the CPU 201, the waveform data output unit 211 (or the sound source LSI and/or voice synthesis LSI in the waveform data output unit 211), the processing unit 306, the singing voice control unit 307, the sound source 308, the singing voice synthesis unit 309, the mute unit 310, and any combinations thereof. For example, the CPU 201 may execute a control processing program loaded from the ROM 202 into the RAM 203 so as to execute these operations.

In addition, an initialization process may be performed at the start of the flow shown below. The initialization process includes interrupt processing, lyrics progression, derivation of TickTime, which is the reference time for automatic accompaniment, tempo setting, song selection, song reading, instrument sound selection, and other processing related to buttons, etc.

The CPU 201 can detect operations of the switch panel 140*b*, the keyboard 140*k*, the pedal 140*p*, and the like based on interrupts from the key scanner 206 at an appropriate timing, and can perform the corresponding processing.

In the following, an example of controlling the progress of lyrics is shown, but the target of the progression control is not limited to this. Based on this disclosure, for example, instead of lyrics, the progression of arbitrary character strings, sentences (for example, news scripts) and the like may be controlled. That is, the lyrics of the present disclosure may be replaced with characters, character strings, and the like.

In the present disclosure, the electronic musical instrument 10 generates singing voice waveform data 217 (voice synthesis data) regardless of the user's playing operation, and controls permission/denial of sound production of the singing voice waveform data 217.

In response to the instruction to start the performance, for example, the electronic musical instrument 10 generates the singing voice waveform data 217 (voice synthesis data) in accordance with the singing data 215 in real time regardless of whether a key press by the user is detected or not.

The electronic musical instrument 10 executes a mute process so that the sound corresponding to the singing voice waveform data 217 (voice synthesis data) generated in real time is not produced while a key press is not detected (the user cannot hear the singing voice). Further, the electronic musical instrument 10 cancels the mute process when a key press is detected (the user can hear the singing voice). The electronic musical instrument 10 does not perform mute processing on the song waveform data 218 (the accompaniment can be heard while the user is not hearing the singing voice).

When the electronic musical instrument 10 detects a user key press, the pitch data in the singing data 215 corresponding to the timing of the user key press is overwritten by the pitch data designated by the user key press. As a result, the singing voice waveform data 217 is generated based on the overwritten pitch data. Here, the electronic musical instrument 10 performs the singing voice generation process regardless of the presence or absence of the mute processing.

In other words, in this embodiment, for example, the processor of the electronic musical instrument 10 generates the singing voice synthesis data (voice synthesis data) 217 according to the singing data 215 in both cases where the user operation (key pressing) on an operating element (key) is detected and where it is not detected. Further, the processor of the electronic musical instrument 10 performs control such that a production of the singing voice according to the generated singing voice synthesis data is permitted when the user operation on an operating element is detected, and does not permit such a production when the user operation on an operating element is not detected.

According to such a configuration, it is possible to control the sound production of the synthetic voice that is being generated in the background based on the user's key press operation as a trigger, so that the part of the lyrics that the user wants to produce can be easily specified.

Further, the processor of the electronic musical instrument 10 causes the singing voice data to progress according to the passage of time in both cases where the user operation on an operating element is detected and where the user operation on an operating element is not detected. With such a configuration, the lyrics generated in the background can be appropriately transitioned.

In this embodiment, when the user operation is detected, the processor of the electronic musical instrument 10 instructs the sound production of the singing voice according to the generated singing voice synthesis data at the pitch specified by the user operation. According to such a configuration, the pitch of the synthesized voice to be produced can be easily changed.

In this embodiment, the processor of the electronic musical instrument 10 causes the singing voice according to the generated singing voice synthesis data to be muted when the above-mentioned user operation is not detected at all. According to such a configuration, it is possible to prevent the synthetic voice from being heard when it is not needed, and it is possible to switch to the sound production of the synthetic voice quickly when it is needed.

Figure 6:
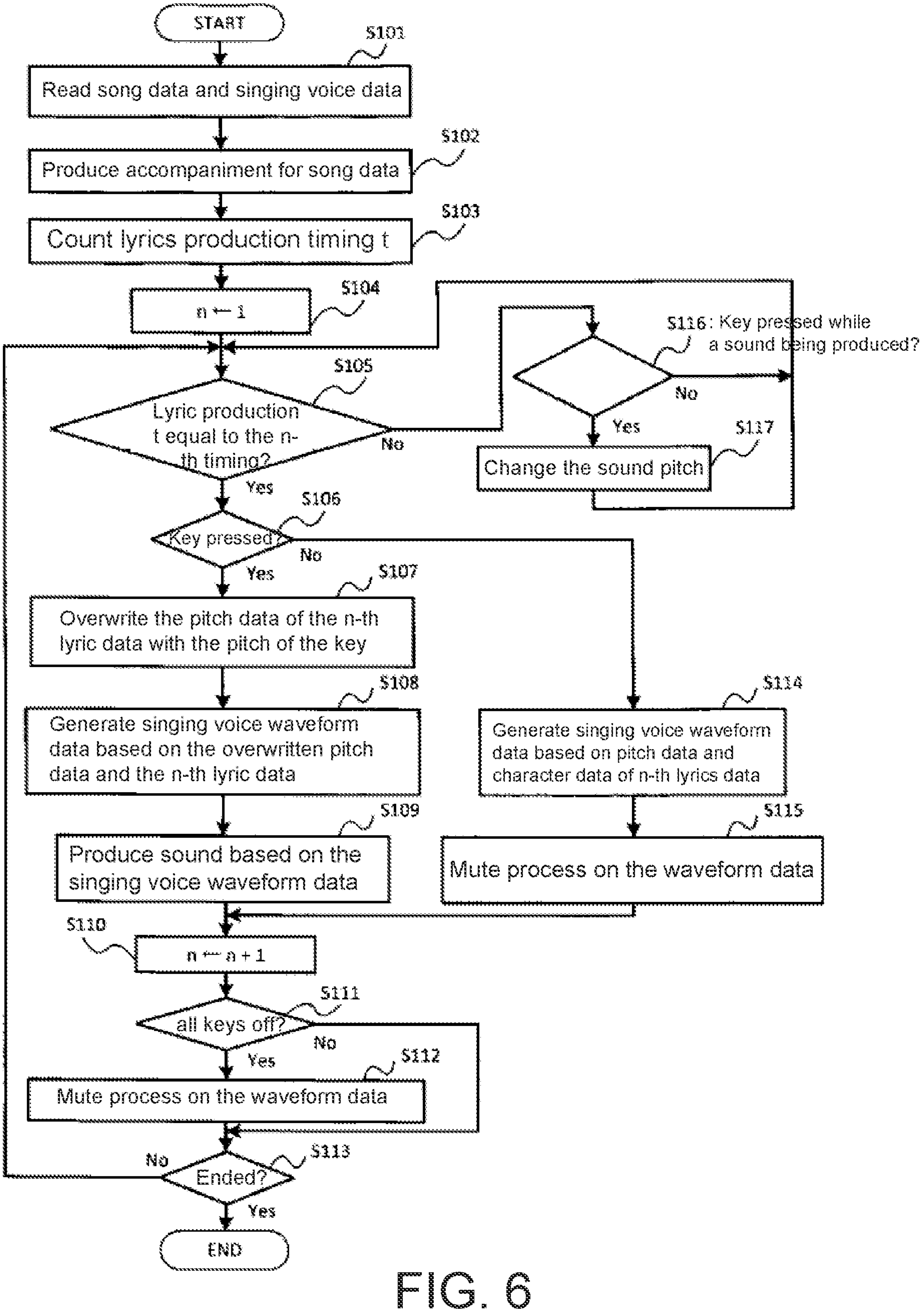
FIG. 6 shows an example of a flowchart of the lyrics progression control method according to an embodiment.

FIG. 6 is a diagram showing an example of a flowchart of the lyrics progression control method according to an embodiment of the present invention.

First, the electronic musical instrument 10 reads the song data and the singing voice data (step S101). The singing voice data (singing voice data 215 of FIGS. 4 and 5) may be singing voice data corresponding to the song data.

The electronic musical instrument 10 starts sound production (in other words, playback of accompaniment) of song data (corresponding to lyrics according to a user operation) (step S102). The user can perform a key press operation in synchronization with the accompaniment.

The electronic musical instrument 10 starts counting up the lyrics production timing t (step S103). The electronic musical instrument 10 may measure this t in the unit of beats, ticks, or seconds. The lyrics production timing t may be counted by the timer 210.

The electronic musical instrument 10 substitutes 1 for the lyrics index (also referred to as "n") indicating the position of the lyrics to be pronounced next (step S104). When the lyrics are started from the middle (for example, starting from a previously stored position), a value other than 1 may be assigned to n.

The lyrics index may be a variable indicating a position in the lyrics from the beginning in terms of syllable (or character) by regarding the entire lyrics as a character string. For example, the lyrics index n may indicate the singing data (n-th lyric data) of the nth singing voice sound production position shown in FIGS. 4 and 5.

In the present disclosure, the lyric corresponding to a single position (lyric index) may correspond to one or a plurality of characters constituting one syllable. The syllables included in the singing data may include various syllables such as vowels only, consonants only, and consonants as well as vowels.

Further, the electronic musical instrument 10 stores the lyrics production timing nt corresponding to the lyrics index n (n=1, 2, . . . , N) based on the start of production of the song data (the beginning of the accompaniment). Here, N corresponds to the last lyrics. The lyrics pronunciation timing tn may indicate a desirable timing of the n-th singing voice sound production position.

The electronic musical instrument 10 determines whether the lyrics production timing t has reached the n-th timing (in other words, t=tn) (step S105). When t=tn (step S105—Yes), the electronic musical instrument 10 determines whether or not there is a key press (a note-on event has occurred) (step S106).

When there is a key press (step S106—Yes), the electronic musical instrument 10 overwrites the pitch data of the n-th lyric data (the pitch data of the readout singing data) with the pitch data corresponding to the key pressed. (Step S107).

The electronic musical instrument 10 generates singing voice waveform data based on the pitch data overwritten in step S107 and the n-th lyric data (the n-th lyric character) (step S108). The electronic musical instrument 10 then performs sound production processing based on the singing voice waveform data generated in step S108 (step S109). This production process may be a process of producing sound only for the duration of the n-th lyrics data unless the mute process is performed by step S112 or the like described later.

In step S109, synthetic voice may be generated according to FIG. 4. For example, the electronic musical instrument 10 acquires the acoustic feature amount data (formant information) of the n-th singing voice data from the singing voice control unit 307, instructs the sound source 308 to produce the musical instrument sound of the pitch corresponding to the key press (instrument sound), and instructs the singing voice synthesis unit 309 to add formant information of the n-th singing voice data to the musical instrument sound waveform data output from the sound source 308.

In step S109, the synthetic voice may be generated according to FIG. 5 instead. In step S109 in the electronic instrument 10, for example, the processing unit 306 inputs the designated pitch data (pitch data corresponding to the pressed key) and the n-th singing voice data (n-th lyrics data) to the singing voice control unit 307. The singing voice control unit 307 estimates the acoustic feature sequence 317 based on the input, and sends the corresponding formant information 318 and the vocal cord sound source data (pitch information) 319 to the singing voice synthesis unit 309.

The singing voice synthesis unit 309 generates and outputs the n-th singing voice waveform data (sung voice waveform data of the n-th lyrics corresponding to the n-th note) based on the input formant information 318 and the vocal cord sound source data (pitch information) 319 to the sound source 308 (via the mute unit 310).

Then, the sound source 308 acquires the n-th singing voice waveform data from the singing voice synthesis unit 309 and performs sound production processing on the data (via the mute unit 310).

Here, other sound production processing in the flowchart may be performed in the same manner.

After step S109, the electronic musical instrument 10 increments n by 1 (substitutes n+1 for n) (step S110).

The electronic musical instrument 10 then determines whether or not all the keys have been released (step S111). When all the keys are released (step S111—Yes), the electronic musical instrument 10 performs a sound mute process on the singing voice waveform data (step S112). The mute process may be performed by the mute unit 310 described above.

After step S112 or step S111—No, the electronic musical instrument 10 determines whether or not the playback of the song data started in step S102 has been completed (step S113). When completed (step S113—Yes), the electronic musical instrument 10 may finish the process of the flowchart and return to the standby state. If not (step S113—No), the process returns to step S105.

When there is no key press after step S105—Yes (step S106—No), the electronic musical instrument 10 generates the singing voice waveform data based on the pitch data of the n-th lyrics data (the pitch data not overwritten) and the character data of the n-th lyrics data (step S114). The electronic musical instrument 10 then performs a sound mute process based on the singing voice waveform data generated in step S114 (step S115), and proceeds to step S110.

When $t<tn$ (step S105—No), the electronic musical instrument 10 determines whether or not a key is pressed while a sound is being produced (for example, there is a sound being produced based on step S109, and a key may be pressed during such a sound production) (step S116). When there is a key press during the sound production (step S116—Yes), the electronic musical instrument 10 changes the pitch of the sound being produced (step S117), and returns to step S105.

The pitch can be changed by, for example, generating singing voice waveform data based on the pitch data corresponding to the pressed key and the lyrics being pronounced (character data of the (n−1)th lyrics data) and by performing sound production process on the resulting data in a manner similar to that described in steps S107 to S109. If there is no key press during the sound production (step S116—No), the process returns to step S105.

Note that step S116 may simply determine whether or not there is a key press, regardless of whether or not the key is pressed during a sound production. In this case, step S117 may be a termination of the mute process that has been performed in steps S112 or S115 (in other words, the muted sound is revived with the sound designated by the pressed key).

Further, if the key press operation in step S106 and/or S116 are simultaneous key presses of a plurality of keys (chord key presses), the harmony singing voice (polyphonic) corresponding to the specified multiple pitches may be produced by steps S107-S109, S117, and the like.

In this flowchart, by applying the mute process instead of a sound erasing process in steps S112, S115, etc., the sound data is generated in the background even if the corresponding sound is not outputted, so that if the user want that sound to be produced, the user can quickly cause that to happen.

Figure 7:
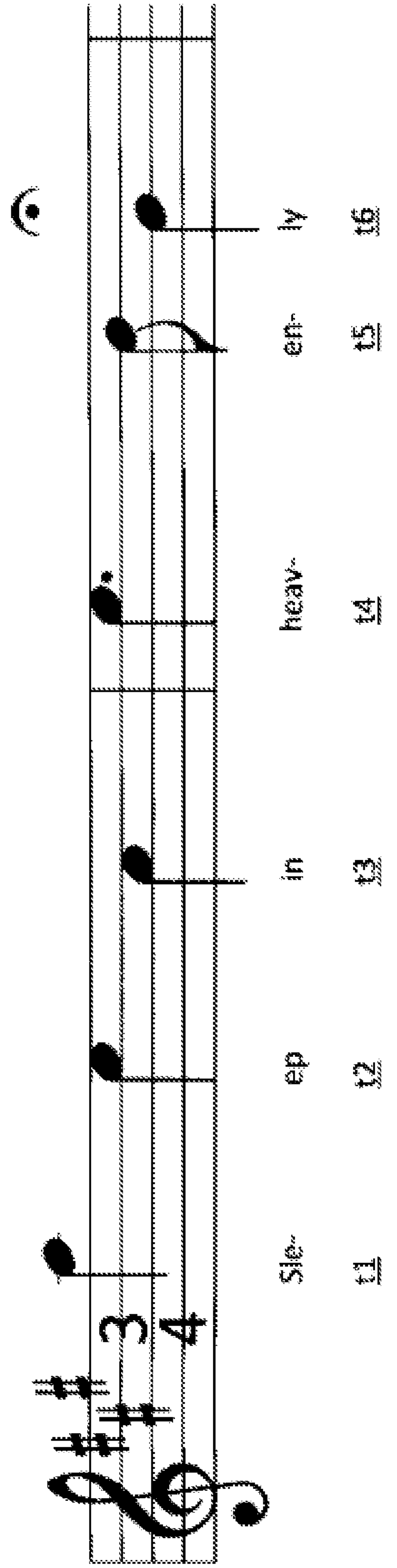
FIG. 7 shows an example of the lyrics progression controlled by using the lyrics progression control method of the embodiment.

FIG. 7 shows an example of the lyrics progression controlled by using the lyrics progression control method of the embodiment. This is an example where the user is playing a music shown in the drawing. Here, it is assumed that the lyrics indices 1-6 correspond to “Sle”, “ep”, “in”, “heav”, “en”, and “ly”, respectively.

In this example, it is assumed that the electronic musical instrument 10 determines that a key is pressed by the user at the timing t1 that corresponds to the lyrics index 1 (steps S105—Yes and steps S106—Yes in FIG. 7). In this case, the electronic musical instrument 10 overwrites the pitch data corresponding to the lyrics index 1 with the pitch data corresponding to the pressed key, and produce the sound of the lyrics “Sle” (steps S107-S109). At this time, the mute process is not applied.

In this example, it is assumed that the electronic musical instrument 10 has determined that there is no key press by the user at the timings t2 and t3 corresponding to the lyrics indices 2 and 3. In this case, the electronic musical instrument 10 generates singing voice waveform data of the lyrics “ep” and “in” corresponding to the lyrics indexes 2 and 3, but performs the mute process on them (steps S114-S115). Therefore, the singing voice of the lyrics “ep” and “in” cannot be heard by the user, but the accompaniment therefor can be heard.

Further, in this example, it is assumed that the electronic musical instrument 10 determines that a key is pressed by the user at the timing t4 corresponding to the lyrics index 4. In this case, the electronic musical instrument 10 overwrites the pitch data corresponding to the lyrics index 4 with the pitch data corresponding to the pressed key, and produce the sound of the lyrics “heav”. At this time, the mute process is not performed.

In this example, it is assumed that the electronic musical instrument 10 has determined that there is no key press by the user at the timings t5 and t6 corresponding to the lyrics indices 5 and 6. In this case, the electronic musical instrument 10 generates singing voice waveform data of the lyrics “en” and “ly” corresponding to the lyrics indexes 5 and 6, but performs the mute process on them. Therefore, the singing voice of the lyrics “en” and “ly” cannot be heard by the user, but the accompaniment therefor can be heard.

That is, according to the lyrics progression control method according to this aspect of the present disclosure, a part of the lyrics sound may not be produced depending on how the user plays the instruments (in the example of FIG. 7, for example, the sound of “epin” between “Sle” and “heav” is not produced).

Whereas the conventional automatic performance automatically plays the lyrics without the user pressing a key (in the example of FIG. 7 above, “Sleep in heavenly” is all sound-produced, and the pitch cannot be changed), according to the lyrics progression control method of this embodiment, the lyrics can be automatically played back only when a key is pressed (and the pitch can also be changed).

In addition, in the conventional technique in which the lyrics progress each time the key is pressed (when applied to the example of FIG. 7, the lyrics index is incremented and the sound produced each time any key is pressed), the position of the lyrics may be exceeded due to excessive times of key pressing, or if the key pressing is insufficient, the lyrics position may not advance as expected. In such cases, synchronization processing (processing to match the lyrics position with the accompaniment playback position) is required to adjust the lyrics position appropriately. In contrast, according to the above-mentioned lyrics progression control method, such a synchronization process is unnecessary, and an increase in the processing load of the electronic musical instrument 10 otherwise required is suppressed, which is desirable.

MODIFICATION EXAMPLES

The voice synthesis processing shown in FIGS. 4 and 5 may be turned on or off based on an operation of the user’s switch panel 140*b*, for example. When it is turned off, the waveform data output unit 211 may be configured to generate and output a sound source signal of musical instrument sound data having a pitch corresponding to the key press operations.

In the flowchart of FIG. 6, some steps may be omitted. If a decision diamond is omitted, it may be interpreted that the corresponding decision always proceeds to the route Yes or No in the flowchart, as the case may be.

The electronic musical instrument 10 may control the display 150*d* to display lyrics. For example, the lyrics near the current lyrics position (lyric index) may be displayed, and the lyrics corresponding to the sound being produced, the lyrics corresponding to the sound that has been produced, and the like may be displayed by coloring them so as to show the current lyrics position.

The electronic musical instrument 10 may transmit at least one of singing voice data, information on the current position of lyrics, and the like to an external device. The external device may perform control to display the lyrics on its own display based on the received singing voice data, information on the current position of the lyrics, and the like.

In the above example, the electronic musical instrument 10 is a keyboard instrument such as a keyboard, but the present invention is not limited to this. The electronic musical instrument 10 may be an electric violin, an electric guitar, a drum, a trumpet, or the like, as long as it is a device having a configuration in which the timing of sound generation can be specified by a user's operation.

Therefore, the "key" of the present disclosure may be a string, a valve, another performance operating element for specifying a pitch, any other adequately provided performance operating element, or the like. The "key press" of the present disclosure may be a keystroke, picking, playing, operation of an operator, or the like. The "key release" in the present disclosure may be a string stop, a performance stop, an operator stop (non-operation), or the like.

The block diagram used in the description of the above embodiments shows blocks of functional units. These functional blocks (components) are realized by adequate combination of hardware and/or software. Further, a specific manner that realizes each functional block is not particularly limited; each functional block or any combinations of functional blocks may be realized by one or more processors, such as one physically connected device, or two or more physically separated devices connected by wire or wirelessly and these plurality of devices.

The terms described in the present disclosure and/or the terms necessary for understanding the present disclosure may be replaced with terms having the same or similar meanings.

The information, parameters, etc., described in the present disclosure may be represented using absolute values, relative values from a predetermined value, or other corresponding information. Moreover, the names used for parameters and the like in the present disclosure are not limited in any respect.

The information, signals, etc., described in the present disclosure may be represented using any of a variety of different technologies. For example, data, instructions, commands, information, signals, bits, symbols, chips, etc., that may be referred to throughout the above description are voltages, currents, electromagnetic waves, magnetic fields or magnetic particles, light fields or photons, or any combinations of them.

Information, signals, etc., may be input/output via a plurality of network nodes. The input/output information, signals, and the like may be stored in a specific location (for example, a memory), or may be managed using a table. Input/output information, signals, etc., can be overwritten, updated, or added. The output information, signals, etc., may be deleted. The input information, signals, etc., may be transmitted to other devices.

Regardless of whether called software, firmware, middleware, microcode, hardware description language, or another name, the term "software" used herein should broadly be interpreted to mean an instruction, instruction set, code, code segment, program code, program, subprogram, software module, applications, software applications, software packages, routines, subroutines, objects, executable files, execution threads, procedures, functions, or the like.

Further, software, instructions, information, and the like may be transmitted and received via a transmission medium. For example, when software is transmitted from a website, a server, or other remote source through wired technology (coaxial cable, fiber optic cable, twist pair, digital subscriber line (DSL: Digital Subscriber Line), etc.) and/or wireless technology (infrared, microwave, etc.), these wired and wireless technologies are included within the definition of the "transmission medium."

The respective aspects/embodiments described in the present disclosure may be used alone, in combination, or switched in accordance with manners of execution. In addition, the order of the processing procedures, sequences, flowcharts, etc., of each aspect/embodiment described in the present disclosure may be changed as long as there is no contradiction. For example, the methods described in the present disclosure present elements of various steps using an exemplary order, and are not limited to the particular order presented.

The phrase "based on" as used in this disclosure does not mean "based only on" unless otherwise stated. In other words, the phrase "based on" means both "based only on" and "based at least on".

Any reference to elements using designations such as "first", "second" as used in this disclosure does not generally limit the quantity or order of those elements. These designations can be used in the present disclosure as a convenient way to distinguish between two or more elements. Thus, references to the first and second elements do not mean that only two elements can be adopted or that the first element must somehow precede the second element.

When "include", "including" and variations thereof are used in the present disclosure, these terms are as comprehensive as the term "comprising". Furthermore, the term "or" used in the present disclosure is intended not to be an exclusive OR.

In the present disclosure, even if an article, for example "a," "an," of "the" in English, is added to a singular noun by translation, a case of a plural nouns may be included within the meaning of that expression.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic musical instrument that can output synthesized lyrics of a song based on lyric data in accordance with operations by a user, comprising:

an operating unit that receives an operation by the user to specify a pitch data; and one or more processors electrically connected to the operating unit, the one or more processors performing the following:

generating voice synthesis data for a lyric of the song based on the lyric data for the song at a timing at which said lyric is supposed to be outputted regardless of whether or not a user operation of the operating unit is detected at said timing;

when the user operation of the operating unit is detected at said timing, causing voice sound synthesized based on the generated voice synthesis data to be outputted; and when the user operation of the operating unit is not detected at said timing, causing the voice sound synthesized based on the generated voice synthesis data not to be outputted.

2. The electronic musical instrument according to claim 1, wherein when the user operation of the operating unit is detected at said timing, the one or more processors overwrite pitch data of the voice synthesis data for the lyric in accordance with a pitch specified by the user operation of the operating unit before causing the voice sound synthesized based on the generated voice synthesis data to be outputted.

3. The electronic musical instrument according to claim 1, wherein when the user operation of the operating unit is not detected at said timing, the one or more processors generate the voice synthesis data for the lyric in accordance with a pitch specified by pitch data contained in the lyric data.

4. The electronic musical instrument according to claim 1, wherein when the user operation of the operating unit is not detected at said timing, the one or more processors cause a mute process to be performed on the voice sound synthesized based on the generated voice synthesis data so as not to output the voice sound.

5. The electronic musical instrument according to claim 1, wherein the one or more processors cause sound of an accompaniment in accordance with song data for the song to be outputted, and wherein when the user operation of the operating unit is not detected at said timing, the one or more processors cause the sound of the accompaniment to continue to be outputted while causing the voice sound synthesized based on the generated voice synthesis data not to be outputted.

6. The electronic musical instrument according to claim 1, further comprising a memory that stores a trained model that has learned acoustic features of a singer's singing voice, wherein the one or more processors generate the voice synthesis data based on acoustic feature data that is outputted from the trained model in response to the lyric data inputted to the trained model.

7. The electronic musical instrument according to claim 1, wherein the lyric data includes first character data corresponding to a first timing, second character data corresponding to a second timing after the first timing, and third character data corresponding to a third timing after the second timing, wherein the one or more processors perform the following:

when the user operation is detected at the first timing, causing synthesized voice sound corresponding to the first character data to be outputted; and when the user operation is not detected at the second timing and the user operation is detected at the third timing, generating voice synthesis data for the second character data at the second timing, causing synthesized voice sound synthesized based on the generated voice synthesis data corresponding to the second character data not to be outputted at the second timing, and causing synthesized voice sound corresponding to the third character data to be outputted at the third timing.

8. A method of controlling an electronic musical instrument performed by one or more processors included in the electronic musical instrument, the electronic musical instrument being configured to output synthesized lyrics of a song based on lyric data in accordance with operations by a user, and including an operating unit that receives an operation by the user to specify a pitch in addition to the one or more processors, the method comprising, via the one or more processors:

generating voice synthesis data for a lyric of the song based on the lyric data for the song at a timing at which said lyric is supposed to be outputted regardless of whether or not a user operation of the operating unit is detected at said timing;

when the user operation of the operating unit is detected at said timing, causing voice sound synthesized based on the generated voice synthesis data to be outputted; and when the user operation of the operating unit is not detected at said timing, causing the voice sound synthesized based on the generated voice synthesis data not to be outputted.

9. The method according to claim 8, wherein when the user operation of the operating unit is detected at said timing, pitch data of the voice synthesis data for the lyric is overwritten in accordance with a pitch specified by the user operation of the operating unit before causing the voice sound synthesized based on the generated voice synthesis data to be outputted.

10. The method according to claim 8, wherein when the user operation of the operating unit is not detected at said timing, the voice synthesis data for the lyric is generated in accordance with a pitch specified by pitch data contained in the lyric data.

11. The method according to claim 8, wherein when the user operation of the operating unit is not detected at said timing, a mute process is performed on the voice sound synthesized based on the generated voice synthesis data so as not to output the voice sound.

12. The method according to claim 8, further comprising, via the one or more processors, causing sound of an accompaniment in accordance with the song data for the song to be outputted, and wherein when the user operation of the operating unit is not detected at said timing, the sound of the accompaniment continues to be outputted while the voice sound synthesized based on the generated voice synthesis data is not outputted.

13. The method according to claim 8, wherein the electronic musical instrument further includes a memory that stores a trained model that has learned acoustic features of a singer's singing voice, wherein the voice synthesis data is generated based on acoustic feature data that is outputted from the trained model in response to the lyric data inputted to the trained model.

14. The method according to claim 8, wherein the lyric data includes first character data corresponding to a first timing, second character data corresponding to a second timing after the first timing, and third character data corresponding to a third timing after the second timing, wherein the method further comprises:

when the user operation is detected at the first timing, causing synthesized voice sound corresponding to the first character data to be outputted; and when the user operation is not detected at the second timing and the user operation is detected at the third timing, generating voice synthesis data for the second character data at the second timing, causing synthesized voice sound synthesized based on the generated voice synthesis data corresponding to the second character data not to be outputted at the second timing, and causing synthesized voice sound corresponding to the third character data to be outputted.

15. An electronic musical instrument that can output synthesized lyrics of a song based on lyric data in accordance with operations by a user, comprising:

an operating unit that receives an operation by the user to specify a pitch; and one or more processors electrically connected to the operating unit, wherein the lyric data includes first character data corresponding to a first timing, second character data corresponding to a second timing after the first timing, and third character data corresponding to a third timing after the second timing, wherein the one or more processors perform the following:

when the user operation is detected at the first timing, causing synthesized voice sound corresponding to the first character data to be outputted; and when the user operation is not detected at the second timing and the user operation is detected at the third timing, generating voice synthesis data for the second character data at the second timing, causing synthesized voice sound synthesized based on the generated voice synthesis data corresponding to the second character data not to be outputted at the second timing, and causing synthesized voice sound corresponding to the third character data to be outputted.

16. A method of controlling an electronic musical instrument performed by one or more processors included in the electronic musical instrument, the electronic musical instrument being configured to output synthesized lyrics of a song based on lyric data in accordance with operations by a user, and including an operating unit that receives an operation by the user to specify a pitch in addition to the one or more processors, wherein the lyric data includes first character data corresponding to a first timing, second character data corresponding to a second timing after the first timing, and third character data corresponding to a third timing after the second timing, and wherein the method comprises, via the one or more processors:

when the user operation is detected at the first timing, causing synthesized voice sound corresponding to the first character data to be outputted; and when the user operation is not detected at the second timing and the user operation is detected at the third timing, generating voice synthesis data for the second character data at the second timing, causing synthesized voice sound synthesized based on the generated voice synthesis data corresponding to the second character data not to be outputted at the second timing, and causing synthesized voice sound corresponding to the third character data to be outputted.

* * * * *